United States Patent
Park et al.

(10) Patent No.: US 8,583,055 B2
(45) Date of Patent: Nov. 12, 2013

(54) BEAM FORMING METHOD AND MULTIPLE ANTENNA SYSTEM USING THE SAME

(75) Inventors: Joun Sup Park, Gyunggi-do (KR); Chul Gyun Park, Gyunggi-do (KR); Young Chai Ko, Seoul (KR); Hyun Ho Lee, Seoul (KR)

(73) Assignees: Samsung Electro-Mechanics Co., Ltd., Suwon (KR); Korea University Industrial & Academic Collaboration Foundation, Seoul (KR)

( * ) Notice: Subject to any disclaimer, the term of this patent is extended or adjusted under 35 U.S.C. 154(b) by 197 days.

(21) Appl. No.: 13/165,266

(22) Filed: Jun. 21, 2011

(65) Prior Publication Data

US 2012/0200459 A1 Aug. 9, 2012

(30) Foreign Application Priority Data

Feb. 8, 2011 (KR) ........................ 10-2011-0011050

(51) Int. Cl.
*H04B 1/00* (2006.01)
*H04B 7/00* (2006.01)

(52) U.S. Cl.
USPC ............ 455/69; 455/101; 455/446; 375/260; 375/267; 342/373; 342/374

(58) Field of Classification Search
USPC ............... 455/19, 24, 25, 63.4, 69, 101, 446, 455/452.2, 562.1, 575.7; 375/260, 267, 375/299, 347; 342/373, 374
See application file for complete search history.

(56) References Cited

U.S. PATENT DOCUMENTS

| | | | | |
|---|---|---|---|---|
| 8,290,443 | B2 * | 10/2012 | Stirling-Gallacher et al. | 455/67.13 |
| 8,351,521 | B2 * | 1/2013 | Lakkis | 375/260 |
| 2006/0154667 | A1 | 7/2006 | Seo et al. | |
| 2009/0189812 | A1 | 7/2009 | Xia et al. | |
| 2009/0232245 | A1 | 9/2009 | Lakkis | |

\* cited by examiner

*Primary Examiner* — Tuan H Nguyen
(74) *Attorney, Agent, or Firm* — McDermott Will & Emery LLP

(57) ABSTRACT

Disclosed are a beam forming method and a multiple antenna system using the same. There is provided a multiple antenna system which forms optimal beam patterns through a transmission of a training sequence between a transmitter and a receiver, each including a plurality of antennas, the multiple antenna system comprising: a transmitter selecting antennas to be activated according to a level and transmitting the training sequence to a receiver through the selected antennas; a receiver selecting the antennas to be activated according to the level and transmitting to the transmitter an index of an optimal transmission weight vector significantly reducing a cost function based on the training sequence transmitted from the transmitter, wherein the transmitter selects antennas so that the beam patterns formed by the antennas selected at a q-th level (q: the index of the level) include the beam patterns formed by the antennas selected at a q+1-th level. As a result, the transmission frequency of the training sequence may be reduced.

8 Claims, 5 Drawing Sheets

BEAM FORMING METHOD AND MULTIPLE ANTENNA SYSTEM USING THE SAME

CROSS-REFERENCE TO RELATED APPLICATIONS

This application claims the priority of Korean Patent Application No. 10-2011-0011050 filed on Feb. 8, 2011, in the Korean Intellectual Property Office, the disclosure of which is incorporated herein by reference.

BACKGROUND OF THE INVENTION

1. Field of the Invention

The present invention relates to a beam forming method capable of reducing a transmission frequency of a training sequence and a multiple antenna system using the same.

2. Description of the Related Art

Recently, schemes to solve a lack of telecommunications frequency resources have been sought. One of these schemes, millimeter wave band communication, is drawing great attention due to the merits of using broadband to obtain a high transmission rate. In addition, since the miniaturization and lightness of an RF device may be implemented due to a short wavelength, international standardization standards for wireless local area networks (WLAN) and a wireless personal area networks (WPAN) have been developed.

In millimeter wave band communication, a beam forming technique using multiple antennas has been widely adopted; in particular, in the millimeter wave band communication, a MIMO-OFDM system in which orthogonal frequency-division multiplexing (OFDM) is coupled with a multi input multi output (MIMO) scheme has been used due to a high spatial correlation of a millimeter wave band channel. As the beam forming technology used in the MIMO-OFDM system, there is provided a codebook-based symbol beam forming technology. In this case, beam forming, one of a plurality of schemes used for a smart antenna, is a technology in which a beam is only irradiated from an antenna to a specific corresponding terminal. The smart antenna may be implemented using a plurality of antennas in order to increase the efficiency thereof. A smart antenna scheme in which a plurality of antennas are mounted in both a transmitter and a receiver is referred to as multi input multi output (MIMO).

The codebook-based symbol beam forming technology is a technology in which a transmitting and receiving weight vector, capable of optimizing a cost function, is selected through a transmission of a training sequence without estimating channel information. That is, it is essential in a transmission procedure of the training sequence for selecting the transmitting and receiving weight vector prior to transmitting data. However, in performing the transmission procedure of the training sequence, the transmission frequency of the training sequence is increased and thus, an excessive amount of time is consumed.

SUMMARY OF THE INVENTION

An aspect of the present invention provides a beam forming method capable of reducing a transmission frequency of a training sequence and a multiple antenna system using the same.

According to an exemplary embodiment of the present invention, there is provided a multiple antenna system forming optimal beam patterns through a transmission of a training sequence between a transmitter and a receiver each including a plurality of antennas, the multiple antenna system including: a transmitter selecting predetermined antennas to be activated according to a stepwise increased level for forming the optimal beam patterns, and transmitting the training sequence to a receiver through the selected antennas; and a receiver selecting the predetermined antennas to be activated according to the level and transmitting to the transmitter an index of an optimal transmission weight vector significantly reducing a cost function based on the training sequence transmitted from the transmitter, wherein the transmitter selects antennas so that the beam patterns formed by the antennas selected at a q-th level (q: the index of the level) include the beam patterns formed by the antennas selected at a q+1-th level.

The transmitter may select antennas so that any one of the beam patterns formed by the antennas selected at the q-th level is equal to a sum of two of the beam patterns formed by the antennas selected at the q+1-th level.

The plurality of antennas may include a uniformly spaced linear antenna array for the transmitter and the receiver, respectively.

The transmitter may select $2^q$ antennas at each level, and a distance D between the antennas selected at each level depends on the following Equation:

$$D = 2^{n-(q+1)} \lambda \qquad \text{Equation}$$

where q represents a level index, n represents a total number of levels, and $\lambda$ represents a length of a carrier wavelength.

The transmitter may transmit the training sequence in two directions at each level, each of the two directions having the transmission of the same training sequence to the receiver twice in each direction.

According to an exemplary embodiment of the present invention, there is provided a beam forming method of forming optimal beam patterns through a transmission of a training sequence between a transmitter and a receiver each including a plurality of antennas, the beam forming method including: (a) selecting predetermined antennas of a transmitter and a receiver to be activated according to a stepwise increased level for forming the optimal beam patterns; (b) transmitting the training sequence from the transmitter to the receiver through the selected antennas; and (c) transmitting an index of an optimal transmission weight vector significantly reducing a cost function based on the training sequence received in the receiver to the transmitter, wherein the operation (a) includes selecting antennas so that the beam patterns formed by the antennas selected at a q-th level (q: the index of the level) include the beam patterns formed by the antennas selected at a q+1-th level.

The operation (a) may include selecting antennas so that any one of the beam patterns formed by the antennas selected from the q-th level is equal to a sum of two of the beam patterns formed by the antennas selected from the q+1-th level.

The plurality of antennas may include a uniformly spaced linear antenna array for the transmitter and the receiver, respectively.

The operation (a) may include selecting $2^q$ antennas at each level, and a distance D between the antennas selected at each level may depend on the following Equation:

$$D = 2^{n-(q+1)} \lambda \qquad \text{Equation}$$

where q represents a level index, n represents a total number of levels, and $\lambda$ represents a length of a carrier wavelength.

In operation (b), the transmitter may transmit the training sequence in two directions at each level, each of the two directions having the transmission of the same training sequence to the receiver twice in each direction.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
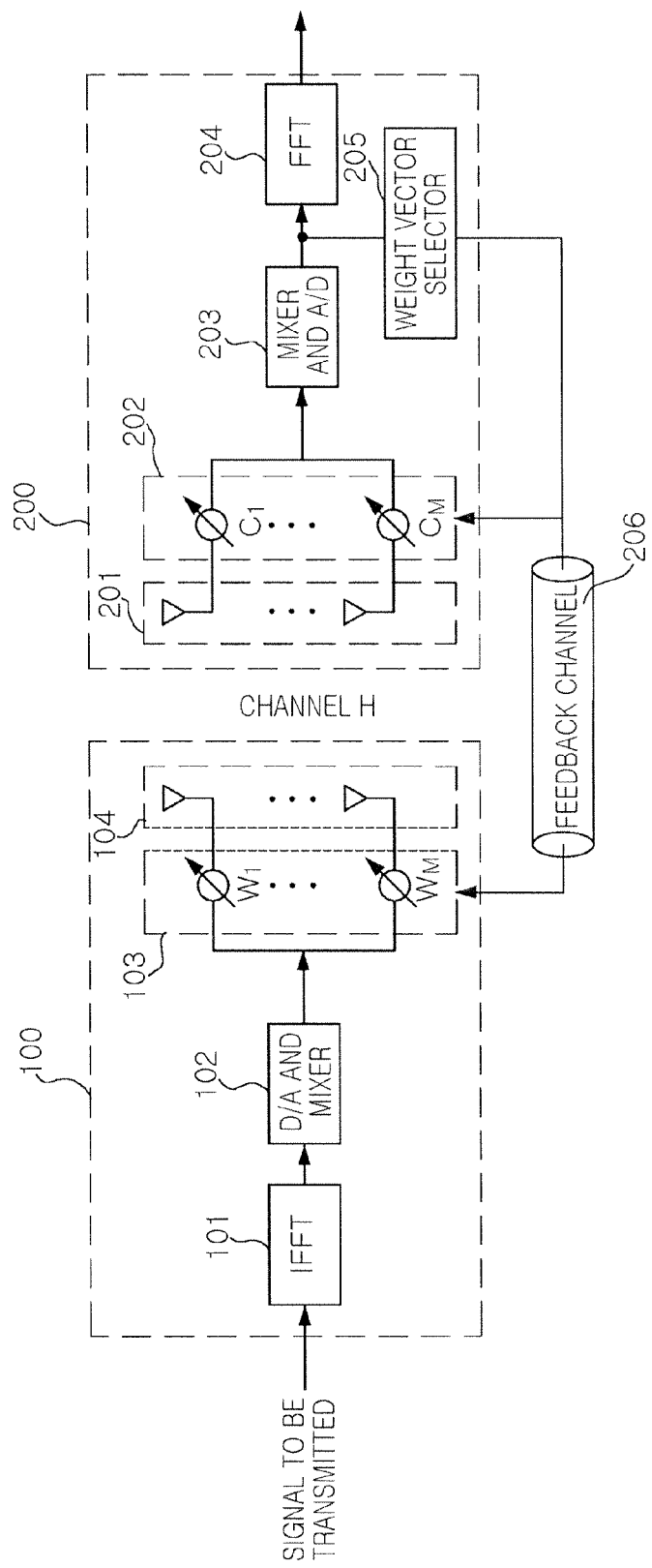
FIG. 1 is a configuration diagram of a multiple antenna system according to an exemplary embodiment of the present invention.

Exemplary embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, throughout the drawings, the same or like reference numerals will be used to designate components having the same functions in the scope of the similar idea.

FIG. 1 is a configuration diagram of a multiple antenna system according to an exemplary embodiment of the present invention. The multiple antenna system may include a transmitter 100 and a receiver 200.

In detail, an inverse fast Fourier transformer (IFFT) 101 of the transmitter 100 may perform inverse fast Fourier transformation on a signal to be transmitted and transmit the results to a D/A and mixer 102.

Meanwhile, the D/A and mixer 102 of the transmitter 100 may convert an inverse fast Fourier transformed signal into an analog signal and mix the converted signal. The mixed signal is transmitted to a beam forming unit 103.

The beam forming unit 103 of the transmitter 100 may multiply the mixed signal transmitted from the D/A and mixer 102 by transmission weight vectors $W_1, \ldots, W_M$ and then transmit the signal to an antenna array 104. The signal transmitted to the antenna array 104 is transmitted to the receiver 200 through a channel H. As shown, the antenna array may include a plurality of antennas. According to the exemplary embodiment of the present invention, the antenna array 104 may include a plurality of uniformly spaced linear antennas.

In particular, according to the exemplary embodiment of the present invention, the beam forming unit 103 may perform a transmission procedure of a training sequence for optimally forming a beam prior to transmitting data. To this end, the beam forming unit 103 may select antennas to be activated according to a level. Thereafter, the beam forming unit 103 multiplies the training sequence by transmission weight vectors $W_1, \ldots, W_M$ and then transmits the training sequence through the selected antennas. The plurality of transmission weight vectors for forming beam patterns are stored in a codebook in advance and the specific transmission weight vectors are multiplied by the training sequence and are transmitted, thereby forming the beam patterns in a specific direction.

Meanwhile, a distance D between the antennas may be determined by the following Equation 1, $$D = 2^{n-(q+1)} \lambda \qquad \text{Equation 1}$$

Herein, q represents a level index, n represents a total number of levels, and $\lambda$ represents a length of a carrier. The meaning of the above Equation 1 will be described below with reference to FIG. 2.

Meanwhile, an antenna array 201 of the receiver 200 may receive the signal transmitted from the transmitter 100 through the channel H and transmit the received signal to a beam forming unit 202. As shown in FIG. 1, the antenna array of the receiver 200 may also include a plurality of uniformly spaced linear antennas. The distance between the antenna arrays 201 of the receiver 200 may also be determined by Equation 1 above.

The beam forming unit 202 of the receiver 200 may multiply the signal transmitted from the antenna array 201 by receiving weight vectors $C_1, \ldots, C_M$ and then transmit the signal to a mixer and A/D converter 203. In detail, each of the signals received by each antenna included in the antenna array 201 is multiplied by the receiving weight vectors $C_1, \ldots, C_M$, which are in turn transmitted to the mixer and A/D converter 203. In particular, according to the exemplary embodiment of the present invention, the beam forming unit 202 selects the antennas to be activated according to a level and receives the signals transmitted from the transmitter 100 through the selected antennas.

The mixer and A/D converter 203 of the receiver 200 may mix the signals transmitted from the antenna array 201 and then convert the mixed signals into digital signals. The converted signals are transmitted to a fast Fourier transformer (FFT) 204.

The fast Fourier transformer 204 of the receiver 200 performs a fast Fourier transformation on the signal transmitted from the mixer and A/D converter 203 and then outputs the fast Fourier transformed signal.

Meanwhile, the weight vector selector 205 of the receiver 200 may receive the mixed signal from the mixer and A/D converter 203 to select the optimal transmission weight vector that significantly reduces the cost function. The index of the selected optimal transmission weight vector is transmitted to the beam forming unit 103 of the transmitter 100 through a feedback channel 206.

Figure 2:
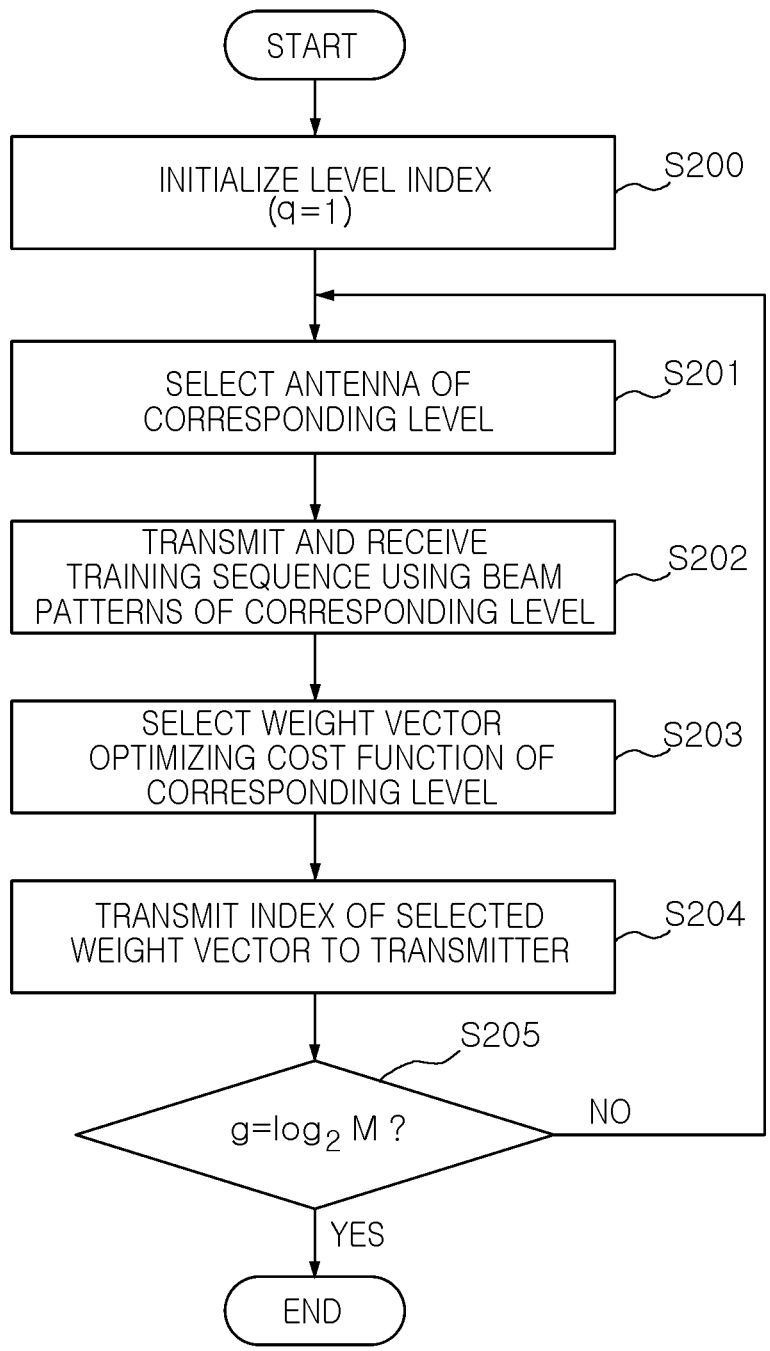
FIG. 2 is a flow chart for explaining a beam forming method according to the exemplary embodiment of the present invention.
Figure 3:
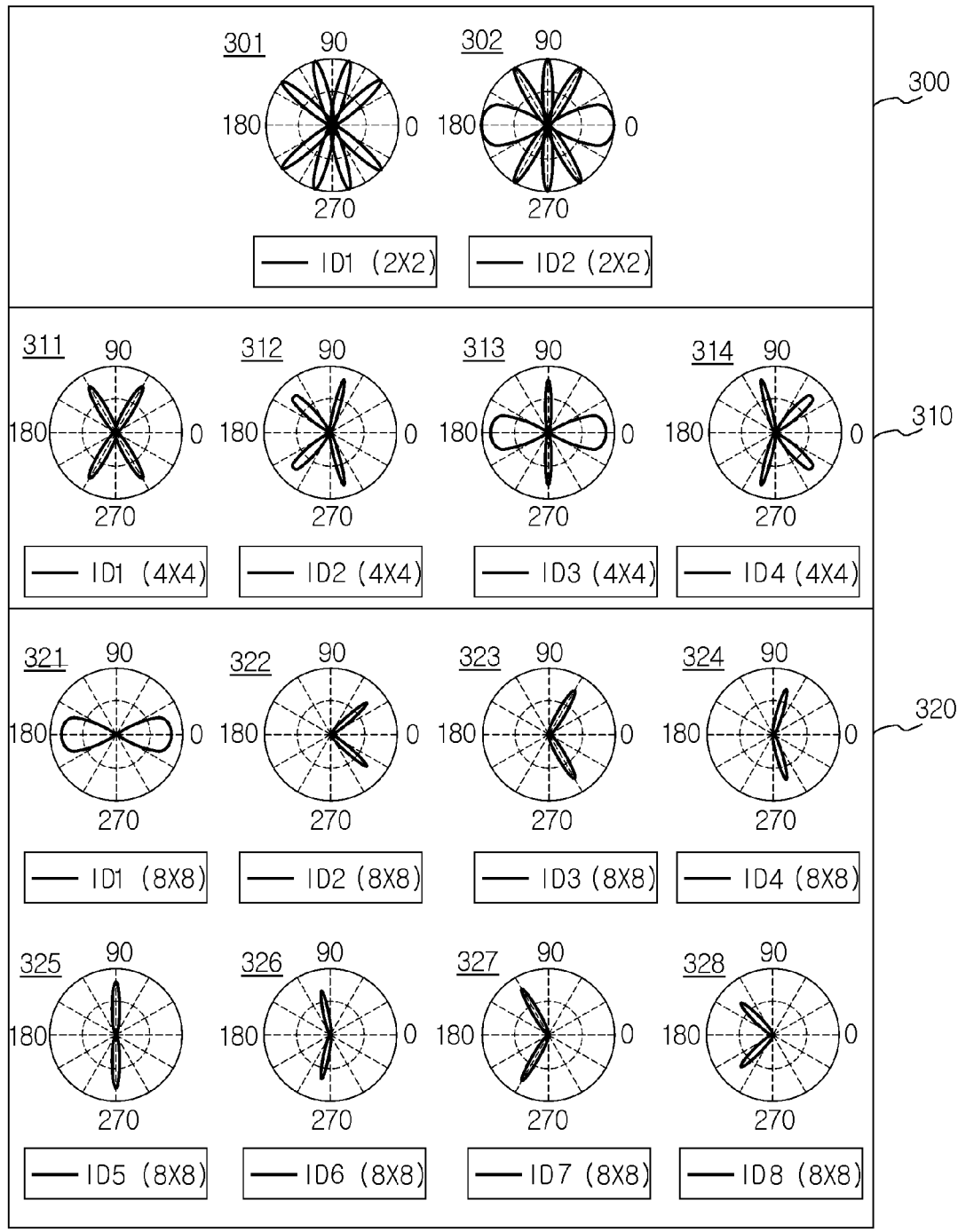
FIG. 3 is a diagram showing beam patterns formed when the number of antennas is 8 according to the exemplary embodiment of the present invention.
Figure 4:
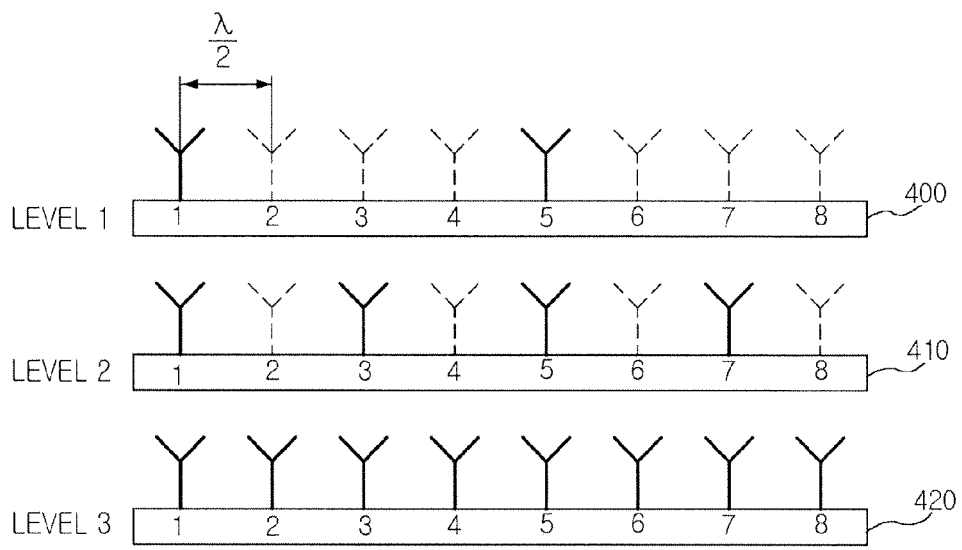
FIG. 4 is a diagram showing a method of selecting an antenna according to a level when the number of antennas is 8 according to the exemplary embodiment of the present invention.

Meanwhile, FIG. 2 is a flow chart for explaining a beam forming method according to the exemplary embodiment of the present invention, FIG. 3 is a diagram showing beam patterns formed when the number of antennas is 8 according to the exemplary embodiment of the present invention, and FIG. 4 is a diagram showing a method of selecting an antenna according to a level when the number of antennas is 8 according to the exemplary embodiment of the present invention.

Hereinafter, the exemplary embodiment of the present invention will be described with reference to FIGS. 1 to 4.

Referring to FIGS. 1 to 4, in operation 200, the beam forming unit 103 of the transmitter 100 and the beam forming unit 202 of the receiver 200 may first initialize the level index q to 1.

In operation 201, the beam forming unit 103 of the transmitter 100 may select the antennas to be activated among the plurality of antennas included in the antenna array 104 according to the level index q. Similarly, the beam forming unit 202 of the receiver 200 may select the antennas to be activated among the plurality of antennas included in the antenna array 201 according to the level index q.

Hereinafter, the antenna selection according to each level will be described in detail. In describing the exemplary embodiment of the present invention, it may be assumed that the number of antennas of the transmitter 100 is the same as the number of antennas of the receiver 200, such as an example in which the number M of antennas included in the antenna array 104 of the transmitter 100 is 8 and the number M of antennas included in the antenna array 201 of the receiver 200 is 8. In this case, an overall level n may be determined according to the following Equation 2.

$$M = 2^n, \ldots, \qquad \text{Equation 2}$$

Herein, M is the number of antennas included in the antenna array and both the transmitter 100 and the receiver 200 are equally 8, while n is the total number of levels. According to the exemplary embodiment of the present invention, $2^q$ antennas may be selected at each level. Therefore, the number of antennas selected according to the increase in the level index q may be increased, and the distance D between the antennas may be reduced. In this case, the selected antennas may be maintained as the same distance. The antenna distance at each level may be represented as the following Table 1.

TABLE 1

| Level Index (q) | Number of selected antennas | Antenna Distance (D) |
|---|---|---|
| 1 | $2^1$ | $D = 2^{n-2} \lambda$ |
| 2 | $2^2$ | $D = 2^{n-3} \lambda$ |
| 3 | $2^3$ | $D = 2^{n-4} \lambda$ |
| ... | ... | ... |
| q | $2^q$ | $D = 2^{n-(q+1)} \lambda$ |
| ... | ... | ... |
| n | $M = 2^n$ | $D = 2^{-1} \lambda$ |

Referring to FIGS. 1 and 4, at a first level (q =1), two ($2^1$) transmitting antennas and two receiving antennas (1 and 5 of FIG. 4) may be selected. In this case, the distance D between the antennas may be 2λ (see 400 of FIG. 4). At a second level (q =2), four ($2^2$) transmitting antennas and four ($2^2$) receiving antennas (1, 3, 5, and 7 of FIG. 4) may be selected. In this case, the distance D between the antennas may be λ (see 410 of FIG. 4). At a third level (q =3), both the eight ($2^3$) transmitting antennas and the eight ($2^3$) receiving antennas (1 to 8 of FIG. 4) may be selected. In this case, the distance D between the antennas may be λ/2 (see 420 of FIG. 4). The beam patterns generated at a q-th level by the above-mentioned antenna selection may include the beam patterns generated at a q+1-th level. An expression "-th" denotes a certain position of a number within a sequence of numbers. For example, "1-th", "2-th", "3-th", and "4-th" are abbreviations of first, second, third, and fourth, respectively. In that, the expression "-th" denotes ordinal numbers. This will be described in detail with reference to FIG. 3.

Referring to FIGS. 3 and 4, two beam patterns 301 and 302 may be formed by the antennas 1 and 5 selected at the first level (q=1) (see reference numeral 300). Four beam patterns 311 to 314 may be formed by the antennas 1, 3, 5, and 7 selected at the second level (q=2) (see reference numeral 310). Meanwhile, eight beam patterns 321 to 338 may be formed by the antennas 1 to 8 selected at the third level (q=3) (see reference numeral 320). In this case, a sum of two beam patterns among the beam patterns generated at the q+1-th level may be the same as any one of the beam patterns generated at the q-th level. For example, one beam pattern 301 of the beam patterns 301 and 302 formed at the first level may be equal to the sum of two beam patterns 312 and 314 of the beam patterns 311 to 314 formed at the second level that is a subsequent level. In addition, one beam pattern 312 of the beam patterns 311 to 314 formed at the second level (q=2) may be equal to the sum of two beam patterns 324 and 328 of beam patterns 321 to 328 formed at the third level (q=3) that is a subsequent level.

In operation 202, the beam forming unit 130 of the transmitter 100 may transmit the training sequence using the beam patterns of the corresponding level. In detail, the beam forming unit 103 of the transmitter 100 at each level transmits the training sequence in two directions, each of the two directions having the transmission of the same training sequence twice in each direction. Therefore, the beam forming unit 202 of the receiver 200 receives a total of four training sequences twice in one direction.

In operation 203, the weight vector selector 205 of the receiver 200 may select the index of the optimal transmission weight vector that significantly reducing the cost function based on the received training sequence.

Then, in operation 204, the weight vector selector 205 of the receiver 200 may transmit the index of the optimal selected transmission weight vector to the beam forming unit 103 of the transmitter 100 through the feedback channel 206.

In operation 205, the beam forming unit 103 of the transmitter 100 may determine whether the level index q is equal to a predetermined total index $\log_2 M$, and, as a result of the determination, if the level index is smaller than the total index (n=$\log_2 M$), operations 201 to 205 are re-performed. In this case, only the direction corresponding to the optimal transmission weight vector selected at the previous level may be used to transmit the training sequence. Therefore, according to the exemplary embodiment of the present invention, since when the number of antennas is 8, the training sequence is transmitted four times for each level, it can be appreciated that the optimal transmission weight vector may be selected through the transmission of the training sequence sixteen times in total. The results of comparing the transmission frequency of the training sequence according to the exemplary embodiment of the present invention with that of the related art are shown in FIG. 5.

Figure 5:
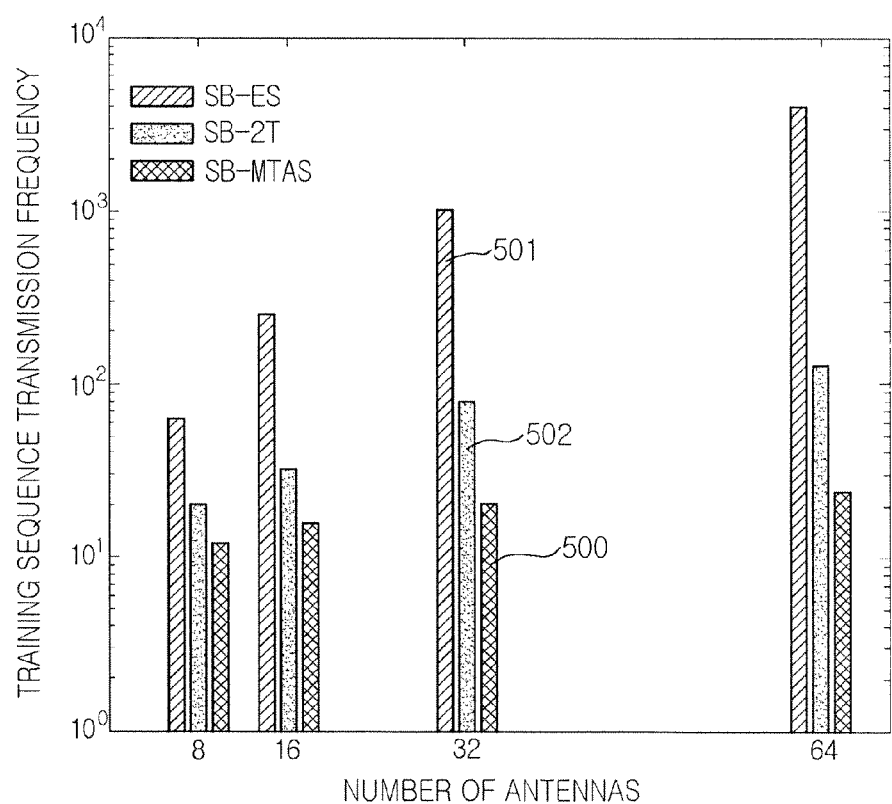
FIG. 5 is a graph comparing a transmission frequency of a training sequence according to the exemplary embodiment of the present invention and the related art.

FIG. 5 is a graph comparing the transmission frequency of the training sequence according to the exemplary embodiment of the present invention and the related art, wherein an X-axis represents the number of antennas and a Y-axis represents the transmission frequency of the training sequence transmitted from the transmitter 100.

Referring to FIG. 5, reference numeral 501 refers to a symbol-wise beam forming with exhaustive search (SB-ES), reference numeral 502 refers to a symbol-wise beam forming with two level training (SB-2T), reference numeral 500 refers to a symbol-wise beam forming with multi-level training and antenna selection (SB-MTAS) according to the exemplary embodiment. As shown in FIG. 5, it can be appreciated that the transmission frequency of the training sequence may be further reduced in the case according to the SB-MTAS method 500 according to the exemplary embodiment of the present invention as compared to in the case according to the related art inventions 501 and 502.

Figure 6:
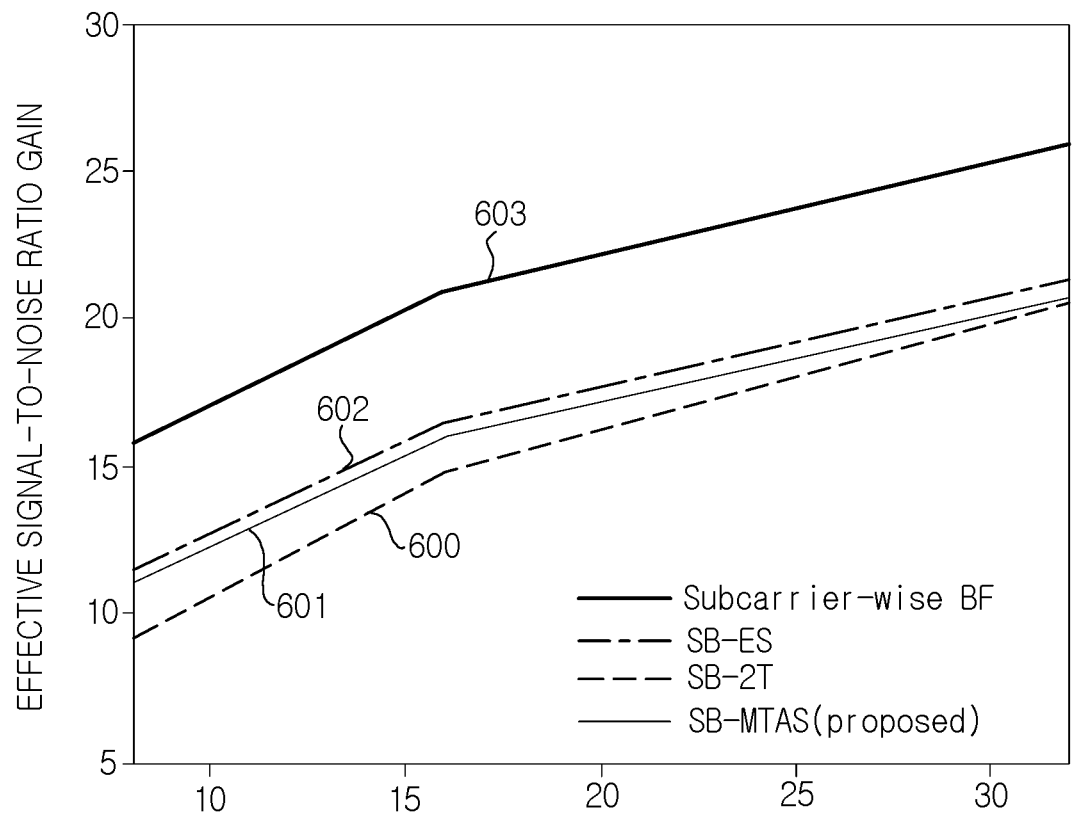
FIG. 6 is a graph comparing an effective signal-to-noise ratio gain according to the exemplary embodiment of the present invention and the related art.

Further, FIG. 6 is a graph comparing an effective signal-to-noise ratio (SNR) gain according to the exemplary embodiment of the present invention and the related art, wherein an X-axis represents the number of antennas and a Y-axis represents an effective SNR gain.

As shown in FIG. 6, it can be appreciated that the effective SNR gain of the SB-MTAS 601 according to the exemplary embodiment of the present invention may approach the SB-ES 602 and may be inferior to that of subcarrier-wise beam forming (BF) 603 but is superior to that of the SB-2T 600.

As set forth above, according to the exemplary embodiment of the present invention, the number of selected antennas may be increased according to the increased level, and the beam patterns formed by the antennas selected at the subsequent level may be included in the beam patterns formed by the antennas selected at the previous level, thereby reducing the transmission frequency of the training sequence, such that the setup time consumed due to the transmission and reception of the weighted vector may be remarkably reduced without losing performance gain.

While the present invention has been shown and described in connection with the exemplary embodiments, it will be apparent to those skilled in the art that modifications and variations can be made without departing from the spirit and scope of the invention as defined by the appended claims.

What is claimed is:

1. A multiple antenna system forming optimal beam patterns through a transmission of a training sequence between a transmitter and a receiver each including a plurality of antennas, the multiple antenna system comprising:
   a transmitter selecting predetermined antennas to be activated according to a stepwise increased level for forming the optimal beam patterns, and transmitting the training sequence to a receiver through the selected antennas; and
   a receiver selecting the predetermined antennas to be activated according to the level and transmitting to the transmitter an index of an optimal transmission weight vector significantly reducing a cost function based on the training sequence transmitted from the transmitter, wherein:
   the transmitter selects antennas so that the beam patterns formed by the antennas selected at a q-th level include the beam patterns formed by the antennas selected at a q+1-th level,
   the transmitter selects $2^q$ antennas at each level, and
   a distance D between the antennas selected at each level depends on the following Equation:
   $D=2^{n-(q+1)}\lambda$, where q is a level index, n is a total number of levels, and $\lambda$ is a length of a carrier.

2. The multiple antenna system of claim 1, wherein the transmitter selects antennas so that any one of the beam patterns formed by the antennas selected at the q-th level is equal to a sum of two of the beam patterns formed by the antennas selected at the q+1-th level.

3. The multiple antenna system of claim 1, wherein the plurality of antennas include a uniformly spaced linear antenna array for the transmitter and the receiver, respectively.

4. The multiple antenna system of claim 1, wherein the transmitter transmits the training sequence in two directions at each level, each of the two directions having the transmission of the same training sequence to the receiver twice in each direction.

5. A beam forming method of forming optimal beam patterns through a transmission of a training sequence between a transmitter and a receiver each including a plurality of antennas, the beam forming method comprising:
   (a) selecting predetermined antennas of a transmitter and a receiver to be activated according to a stepwise increased level for forming the optimal beam patterns;
   (b) transmitting the training sequence from the transmitter to the receiver through the selected antennas; and
   (c) transmitting an index of an optimal transmission weight vector significantly reducing a cost function based on the training sequence received in the receiver to the transmitter, wherein:
   the operation (a) includes selecting antennas so that the beam patterns formed by the antennas selected at a q-th level include the beam patterns formed by the antennas selected at a q+1-th level,
   the operation (a) includes selecting $2^q$ antennas at each level, and
   a distance D between the antennas selected at each level depends on the following Equation:
   $D=2^{n-(q+1)}\lambda$, where q is a level index, n is a total number of levels, and $\lambda$ is a length of a carrier.

6. The beam forming method of claim 5, wherein the operation (a) includes selecting antennas so that any one of the beam patterns formed by the antennas selected at the q-th level is equal to a sum of two of the beam patterns formed by the antennas selected at the q+1-th level.

7. The beam forming method of claim 5, wherein the plurality of antennas include a uniformly spaced linear antenna array for the transmitter and the receiver, respectively.

8. The beam forming method of claim 5, wherein in the operation (b), the transmitter transmits the training sequence in two directions at each level, each of the two directions having the transmission of the same training sequence to the receiver twice in each direction.

* * * * *